United States Patent
Cannon et al.

(10) Patent No.: US 6,529,587 B1
(45) Date of Patent: Mar. 4, 2003

(54) METHOD FOR SCREENING ACTIVE VOICE MAIL MESSAGES

(75) Inventors: Joseph M. Cannon, Harleysville, PA (US); Donald Alfred Fleck, Emmaus, PA (US); James A. Johanson, Macungie, PA (US); Philip David Mooney, North Wales, PA (US)

(73) Assignee: Agere Systems Inc., Allentown, PA (US)

( * ) Notice: Subject to any disclaimer, the term of this patent is extended or adjusted under 35 U.S.C. 154(b) by 0 days.

(21) Appl. No.: 09/300,109

(22) Filed: Apr. 27, 1999

(51) Int. Cl.[7] .................................. H04M 11/00
(52) U.S. Cl. ........................... 379/88.18; 379/88.22; 379/388.04
(58) Field of Search ................. 379/67, 77, 88, 379/89, 215, 112.01, 67.1, 68, 88.22, 88.01, 88.18

(56) References Cited

U.S. PATENT DOCUMENTS

| | | | | | |
|---|---|---|---|---|---|
| 4,903,291 A | * | 2/1990 | Tsurufuji et al. | ............ | 379/88 |
| 5,651,054 A | * | 7/1997 | Dunn et al. | ............ | 379/204.01 |
| 5,768,344 A | * | 6/1998 | Kruger et al. | ......... | 379/217.01 |
| 5,835,573 A | * | 11/1998 | Dee et al. | .............. | 379/114.03 |
| 5,867,574 A | * | 2/1999 | Eryilmaz | ............... | 379/388.04 |
| 5,956,389 A | * | 9/1999 | Jung | ....................... | 379/88.12 |
| 6,337,898 B1 | * | 1/2002 | Gordon | ................. | 379/142.01 |

* cited by examiner

*Primary Examiner*—Fan Tsang
*Assistant Examiner*—Simon Sing

(57) ABSTRACT

A method for screening an active incoming voice mail message broadcasts the incoming message in real time on a speaker in or associated with the subscriber's telephone set upon and concurrent with receipt of the same by the voice mail system. Upon detection during the broadcast of an interrupt request provided by the subscriber via the subscriber's telephone set, the calling party is connected with the subscriber, and normal recording of the message by the voice mail system is discontinued.

18 Claims, 3 Drawing Sheets

METHOD FOR SCREENING ACTIVE VOICE MAIL MESSAGES

BACKGROUND OF THE INVENTION

1. Field of the Invention

The present invention relates to call screening, and more particularly to call screening of an active voice mail message in a voice mail system.

2. Description of the Related Art

With the inception of the telephone answering device (TAD), the population has been provided with the ability to record a message from an incoming caller and subsequently return the call at the called party's convenience. When using a TAD, the incoming message being recorded is generally also concurrently broadcast through a speaker on the device itself. If the called party is present in the area of the TAD when the incoming call is received, he or she can listen to the message being left in real time, and decide whether to take the call—commonly referred to as "screening". If the called party wants to speak to the calling party at any point during screening, she may simply pick up the telephone receiver and thereby interrupt the message being left by the calling party. Generally, TADs will sense the drop in the DC line voltage of the telephone line resulting from the off-hook state of the telephone receiver, and discontinue the recording of the message. A TAD, however, cannot receive and record a message for the called party while the telephone line it is connected to is in use. Thus, a calling party will receive a busy signal and is required to wait for the line to be available.

An alternative to the TAD is the voice mail system. The voice mail system can be implemented in many ways, such as for example through a private branch exchange (PBX) or through a central switching office (e.g. telephone service provider). One advantage of the voice mail system over the standard TAD is that when the line being called is busy, the system enables the calling party to leave a message for the called party, who may then listen to the message and return the call. A shortcoming of the voice mail system is that the called party cannot listen to a voice mail message as it is being recorded (i.e. screen an active voice mail message). In this case, the called party is forced to wait until the calling party completes the recording of the message, then listen to the recorded message, and then return the telephone call.

SUMMARY OF THE INVENTION

A method for screening an active voice mail message, in accordance with a first embodiment of the present invention, comprises the steps of detecting the presence of an active incoming message from a calling party for a voice mail subscriber; determining whether the subscriber's telephone set is currently in use or off-hook; sending the active voice message to the subscriber's telephone set if the set is on-hook (i.e., not off hook); broadcasting the sent active voice message through a speaker in the subscriber's telephone set as the message is received by voice mail system and which concurrently records the incoming message in the voice mail system; and enabling the subscriber to selectively interrupt the active voice message being broadcast and thereby communicate directly with the calling party.

When the active incoming voice mail message is received while the subscriber's telephone is off-hook (i.e. the subscriber's telephone set is in use), the message is recorded as usual by the voice mail system.

Other objects and features of the present invention will become apparent from the following detailed description considered in conjunction with the accompanying drawings. It is to be understood, however, that the drawings are designed solely for purposes of illustration and not as a definition of the limits of the invention, for which reference should be made to the appended claims. It should be further understood that the drawings are not necessarily drawn to scale and that, unless otherwise indicated, they are merely intended to conceptually illustrate the structures and procedures described herein.

BRIEF DESCRIPTION OF THE DRAWINGS

In the drawings, wherein like reference numerals denote like elements throughout the several views.

DETAILED DESCRIPTION OF THE PRESENTLY PREFERRED EMBODIMENTS

Figure 1A:
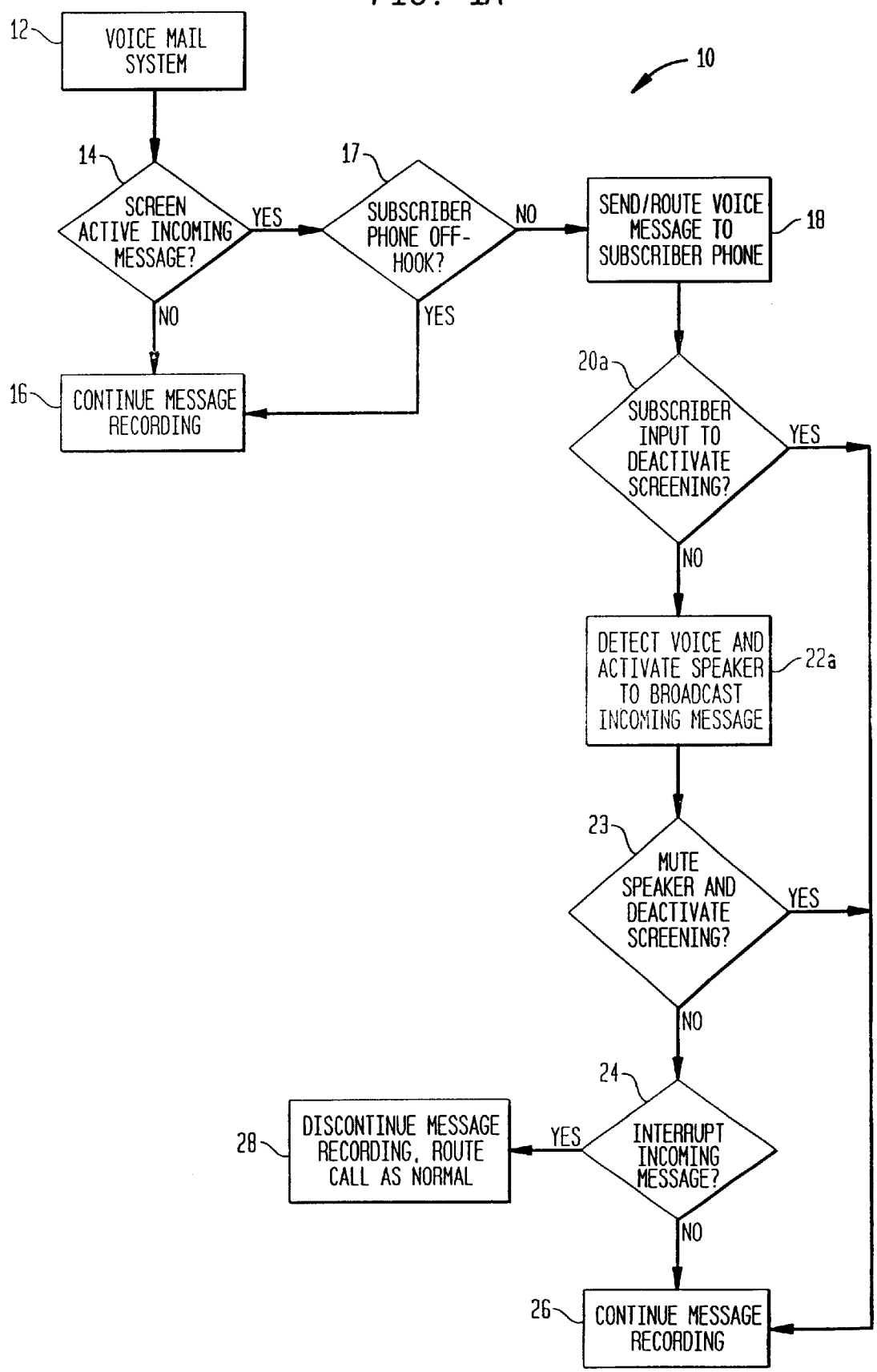
FIG. 1a is a flow chart of a method for screening a voice mail message in accordance with a first embodiment of the present invention.

Referring specifically to FIG. 1a, the inventive method 10 according to a first embodiment as herein disclosed for screening a voice mail message is typically implemented by using a voice mail system provided, for example, through a PBX telephone system or by a telephone service provider such as a local telephone company or mobile telephone service provider. Upon receipt at step 12 of an incoming call into the voice mail system, and an active voice mail message is being left or about to be left by the caller, it is first determined by the voice mail system whether the active incoming message is to be screened (step 14). This is a feature that can be subscriber configurable, as for example by way of access to the voice mail system's main subscriber menu or as an additional service that is offered to voice mail system subscribers from the voice mail service provider. If the subscriber has not activated call screening mode or has not subscribed to that service of the voice mail provider, the incoming call/message is recorded in the usual fashion (step 16) in accordance with the voice mail system functionality.

When the subscriber has activated the message screening function, or subscribes to the service of the same (so that the same is active), and it is determined (step 17) that the subscriber's telephone set is not already in the off-hook state (i.e. that the telephone set is on-hook), the call is sent or routed (step 18) to the voice mail subscriber's telephone set. For example, in a PBX system, the call is routed to that subscriber's telephone or system extension. In cases in which the voice mail system is provided by or remotely resident in the central office of a telecommunication service provider, the call is forwarded (i.e. sent)—in addition to (and typically concurrent with) the message recording device or apparatus of the voice mail system for recording of the incoming active message—to the subscriber's mobile or residential telephone that is connected, in the wired or wireless sense, to the service provider. In any event, when the subscriber's telephone set determines that an incoming message is present, as for example by detection of the presence of voice on the line or connection serving it, a speaker within the telephone set is activated and the active incoming voice mail message is audibly broadcast to the surroundings through the speaker (step 22a). The speaker may for example be one normally used for speakerphone functionality in a desktop or wall mounted telephone set, or the normal earpiece speaker in a wired or mobile or wireless telephone handpiece or handset, or any other speaker in, or associated with, a telephone set and permitting the broadcast therethrough of a message to be heard by the subscriber even when the telephone set is not in normal use.

The subscriber's telephone set as contemplated herein is typically one having a power supply, implemented by way of example through a battery or an active or other power source or connection. The power supply of the telephone set provides the necessary power for activation of the telephone's speaker. The detection of the presence of voice on the telephone line by the telephone set can be performed in any known or suitable manner, as for example by introducing a high impedance (5 Meg Ohms) into the network in a manner similar to that in which Caller ID and Visual Message Waiting Indicator functions are commonly implemented. The voltage resulting from this application is suitable to drive a digital signal processor (DSP) operable for detecting the presence of speech on the telephone line or connection; the DSP can then activate the speaker using an audio amplifier (if necessary) in the telephone set for audible ambient broadcast of the incoming or active message broadcast.

In an optional modification of the inventive method of FIG. 1a, prior to the broadcast of the incoming message, and concurrent with its receipt by the voice mail system from the calling party (step 22a), the voice mail system detects whether the subscriber has previously input a deactivation code to deactivate the call screening mode (step 20a). The subscriber normally inputs such a screening deactivation code prior to the receiving and broadcasting of any particular message or series of messages, thereby informing the voice mail system that the user does not wish to thereafter utilize the screening mode or functionality of the invention—at least until the user otherwise notifies the system. The call screening deactivation instruction or code can be input using a predetermined one or more DTMF keys, or a dedicated key on or associated with the subscriber's telephone set. If the subscriber has input the screening deactivation code, the deactivation state is detected at step 20a, and the broadcasting at step 22a is not performed. In such cases, the incoming message is simply recorded by the voice mail system in the usual manner for later retrieval (step 26).

Figure 1B:
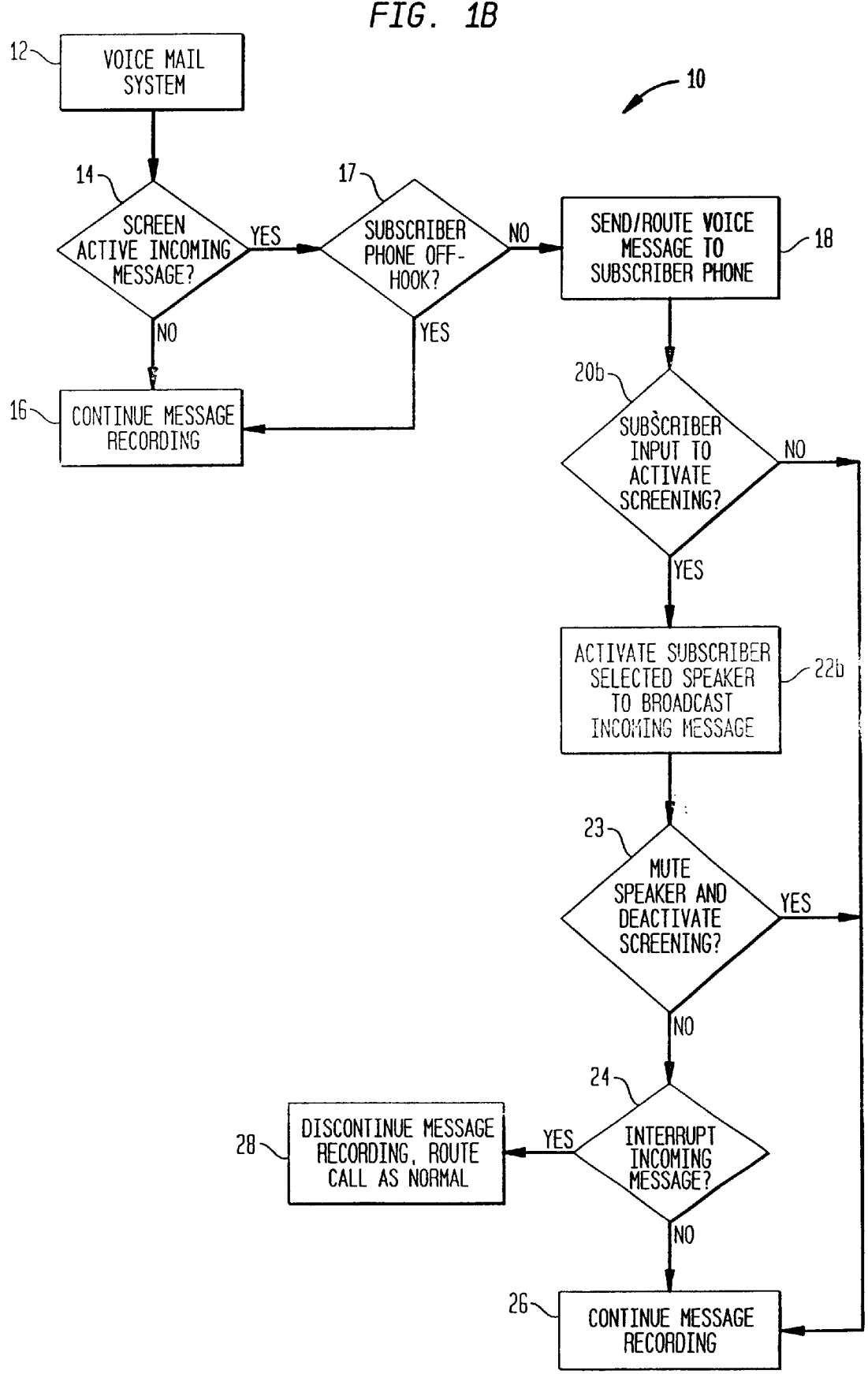
FIG. 1b is a flow chart of a method for screening a voice mail message in accordance with a second embodiment of the present invention.

In a further modified embodiment of that shown in FIG. 1a, it is determined whether the subscriber has input an activation code at step 20b (FIG. 1b). This activation code is such that the subscriber can select what kind of call screening mode they desire, and more particularly, which speaker they would like to have the incoming message broadcast through. A subscriber having the voice mail screening service may not want to every incoming message broadcast through the telephone speaker. In this mode, whoever is in the surrounding area of the subscriber's telephone set will be able to listen in on the incoming message. As such the subscriber is provided with an option for enabling the screening through the speaker in the telephone set receiver. For example, if the subscriber has input a predetermined activation code (step 20b), the subscriber's telephone set will indicate the presence of the incoming message by illuminating a light on the telephone set, or providing a distinctive ring. Once alerted to the presence of the incoming message, the subscriber can, for example, pick up the telephone set receiver which activates the subscriber selected speaker (step 22b) and listen to the incoming message through the speaker in the receiver handset.

During the call screening broadcast of the incoming message, the subscriber has the option of muting the speaker and thereby deactivating the screening mode (step 23). Such muting of the speaker and deactivation of the screening mode can be implemented using one or more DTMF keys, or a dedicated key on the subscriber's telephone set. When the subscriber decides to mute the speaker broadcasting the incoming message and thereby deactivate screening mode, the normal recording of the message continues (step 26). If the subscriber does not mute the speaker and deactivate the screening mode, the system determines whether the subscriber wishes to interrupt the incoming message (step 17)—this interruption is preferably performed by placing the telephone set in the off-hook condition (i.e. picking up the on-hook telephone), or can be performed by depressing a dedicated key , one or more DTMF keys on the subscriber's telephone set or supplying a voice command for a voice activated system incorporated into the telephone set. Once the broadcast is interrupted, message recording may be discontinued, a direct connection between the calling party and the subscriber is effected, and the call is routed normally (step 28). This method thus gives the subscriber the ability to effectively screen and selectively accept or decline calls in a manner analogous to that provided by conventional telephone answering devices (TADs). When the subscriber chooses to not interrupt the ongoing broadcast of the incoming message (step 24), the broadcast and recording of the message continue as usual (step 26) until the calling party completes the message and terminates the connection.

When, at step 17, it is determined that the subscriber's telephone set is in the off-hook condition at the time of receipt of an incoming message (or during the playing of the outgoing message), the recording of the message is effected as usual (step 16) and incoming message screening does not occur.

When voice mail system monitoring indicates that the subscriber has not deactivated the call screening/monitoring mode (steps 20a and 23), or that the subscriber has not interrupted the local broadcast of the incoming message (step 24), the message is also concurrently recorded (step 26) as in normal operation of the voice mail system, and the broadcast terminates when the active incoming message ends or the communication connection is terminated by the calling party.

Figure 2:
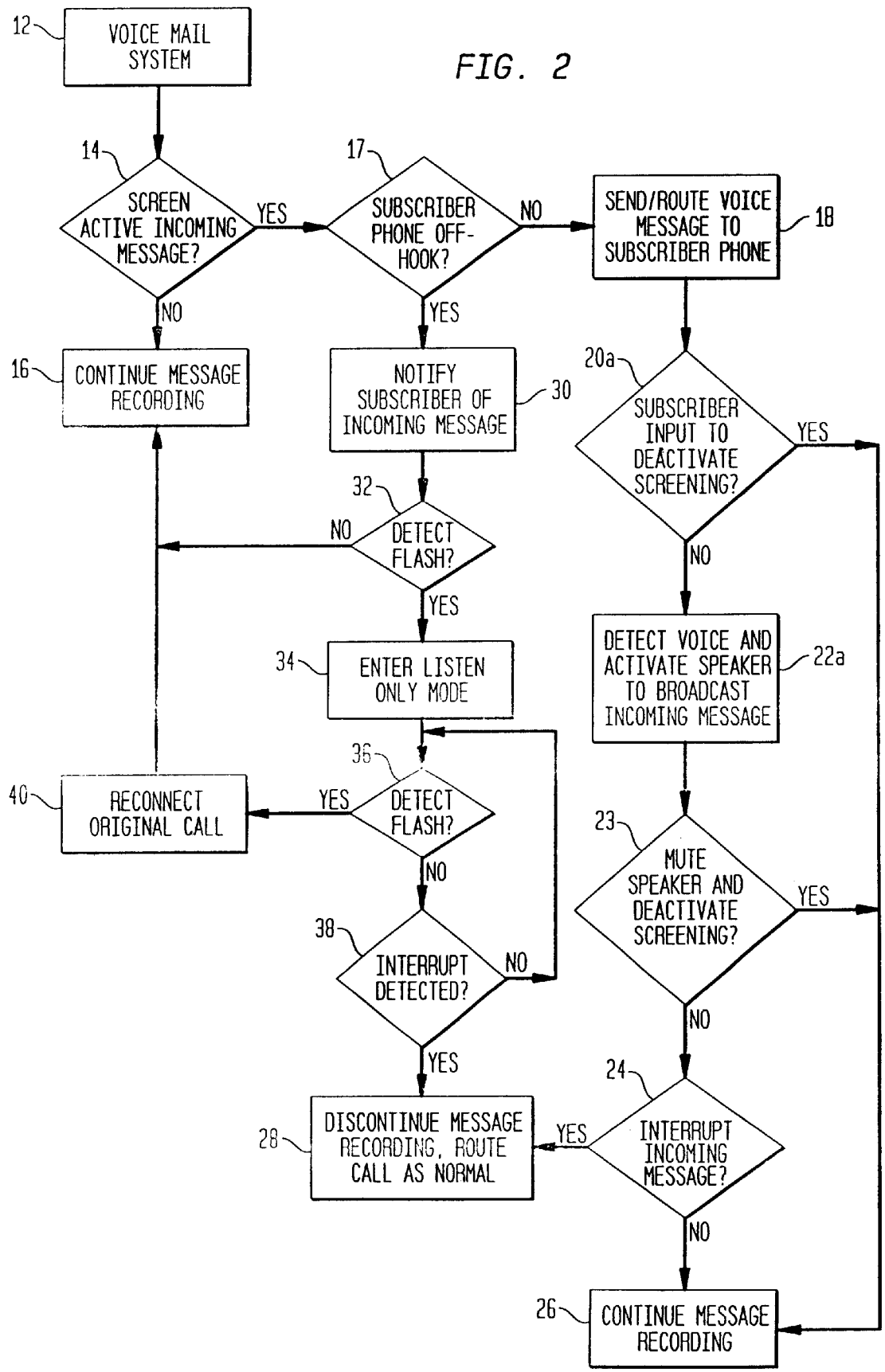
FIG. 2 is a flow chart of a method for screening a voice mail message in accordance with a third embodiment of the invention.

FIG. 2 depicts a second or modified embodiment of the invention. When the subscriber's telephone set is determined at step 17 to be off-hook during system receipt of an active incoming message, which indicates that the called party is currently on a call with another party, the called party is notified as to the presence of the incoming message (step 30). This notification can take the form of a tone generated on the subscriber's line, such as a call waiting tone, or the illumination of a light on the subscriber's telephone set. In a preferred embodiment the notification, at step 30, is performed concurrent with the playing of the outgoing message to the calling party, but may alternatively be postponed until actual recording of the incoming message begins to ensure that the calling party in fact proceeds to leave a message. In an alternative embodiment, the notification at step 30 can take the form of a display of the incoming caller's telephone number, as in a type II Caller ID system. Thus, the subscriber in such an arrangement can view the incoming caller's telephone number on a display screen included with the subscriber's telephone set and thereby identify the source of the incoming call.

Once the subscriber has been notified (step 30), a determination is made as to whether the subscriber has activated the FLASH hook button on their telephone set. The FLASH hook, as implemented herein, is identical to the FLASH hook action performed for switching between two calls when using a conventional call waiting service of the service provider. If no FLASH is detected, this indicates that the subscriber has chosen to not screen the incoming call, and the incoming message is simply recorded in the usual manner (step 16). Where the subscriber has activated the FLASH key in response to the notification provided at step 30, the original ongoing call or communication session is placed on hold, and the subscriber's telephone set is connected to the incoming voice message in a listen only mode (step 34). While in listen only mode, the voice mail system determines whether the subscriber has again activated the FLASH key (step 36) during listen only mode; if so, the original call is reconnected to the subscriber's telephone set (step 40), and the recording of the incoming message continues (step 16). Where the subscriber does not activate the FLASH key during listen only mode (step 36), it is then determined (step 38) whether the subscriber wishes to interrupt the call—this intended interruption can be indicated by subscriber depression of a dedicated key, one or more DTMF keys on the subscriber's telephone set, or a voice command for a voice controlled feature of the telephone set. Once the broadcast is interrupted, message recording is discontinued, a direct connection between the calling party and the subscriber is effected, and the call is routed normally (step 28).

When the subscriber thus interrupts the incoming message (step 38), the original caller to whom the subscriber was connected is maintained in a hold status, and the operation of the subscriber's telephone is governed by standard call waiting procedure in situations including two incoming or connected calls.

The detection of the off-hook condition of the subscriber's telephone set at step 17 can, by way of example, be performed by the voice mail system by monitoring the line voltage or impedance of a wired telephone, and/or using overhead channel information or control information transmitted from a wireless mobile telephone to the service provider.

While there have been shown and described and pointed out fundamental novel features of the invention as applied to preferred embodiments thereof, it will be understood that various omissions and substitutions and changes in the form and details of the methods and devices illustrated, and in their operation, may be made by those skilled in the art without departing from the spirit of the invention. For example, it is expressly intended that all combinations of those elements and/or method steps which perform substantially the same function in substantially the same way to achieve the same results are within the scope of the invention. Moreover, it should be recognized that structures and/or elements and/or method steps shown and/or described in connection with any disclosed form or embodiment of the invention may be incorporated in any other disclosed or described or suggested form or embodiment as a general matter of design choice. It is the intention, therefore, to be limited only as indicated by the scope of the claims appended hereto.

We claim:

1. A method for screening an active incoming message in a voice mail system at a telephone set remotely connected to the voice mail system and associated with a subscriber to the voice mail system, comprising the steps of:

detecting, by the voice mail system, presence of an incoming communication connection from a calling party and intended for the subscriber;

determining by the voice mail system, when the presence of an incoming communication connection is detected, whether the telephone set associated with the subscriber is in an on-hook or an off-hook condition;

transmitting to the subscriber telephone set an incoming voice mail message as the incoming voice mail message is received by the voice mail system;

routing, by the voice mail system and in response to a determined on-hook condition of the subscriber's telephone set, the incoming voice mail message to the subscriber's telephone set;

detecting presence of voice on a communication connection connecting the voice mail system to the subscriber's telephone set; and broadcasting the routed incoming active voice mail message through a speaker in the subscriber's telephone set as the incoming active voice mail message is received by the voice mail system.

2. The method set forth in claim 1, further comprising the steps of:

determining, in the voice mail system and in response to determination of the on-hook condition of the subscriber's telephone set, whether the subscriber has input at the telephone set a de-activation code for de-activating a call screening mode in which incoming active voice mail messages are broadcast to the subscriber's telephone set; and recording the incoming active voice mail message in the voice mail system without broadcasting the message through the speaker when it is determined that the de-activation code has been input.

3. The method set forth in claim 2, wherein said step of broadcasting is performed in response to a determination that the subscriber has not input the de-activation code.

4. The method set forth in claim 1, further comprising the steps of:

determining, by the voice mail system, whether the subscriber has input at the subscriber telephone set a de-activation code to deactivate broadcasting of the incoming active voice mail message;

deactivating the broadcast of the incoming message in response to a determination that the deactivation code has been input; and continuing recording of the incoming voice mail message after said deactivating the broadcast of the incoming voice mail message.

5. The method set forth in claim 1, further comprising the steps of:

determining, by the voice mail system, whether the subscriber has input at the subscriber telephone set a de-activation code to deactivate broadcasting of the incoming voice message;

determining, by the voice mail system and in response to a determination that the deactivation code has not been input, whether the subscriber has input at the subscriber's telephone set an interruption request indicating a subscriber desire to interrupt the incoming active voice mail message; and interrupting broadcasting of the incoming voice mail message in response to a determination that the subscriber has input the interrupt request.

6. The method set forth in claim 5, further comprising the steps of:
   deactivating broadcasting of the active incoming voice mail message in response to a determination that the deactivation code has been input at the subscriber's telephone set; and
   continuing recording by the voice mail system of the active incoming message following said deactivating of said broadcast.

7. The method set forth in claim 5, further comprising the step of continuing recording, by the voice mail system, of the active incoming voice mail message in response to determining that no interrupt request input has been input.

8. The method set forth in claim 5, further comprising the steps of:
   discontinuing, in the voice mail system, recording of the active incoming message in response to a received interrupt request input entered at the subscriber telephone set; and
   establishing a communication connection between the subscriber telephone set and the calling party for interactive communication between the subscriber and the calling party in response to the received interrupt request input.

9. The method set forth in claim 5, wherein said interrupt request is input by momentarily changing the subscriber's telephone set from the on-hook condition to the off-hook condition.

10. The method set forth in claim 5, wherein said interrupt request is input by activation of one of a predetermined DTMF key, a predetermined sequence of DTMF keys, and a dedicated key on the subscriber's telephone set.

11. The method set forth in claim 1, further comprising the steps of:
   notifying the subscriber of the presence of an active incoming message when it is determined that the subscriber's telephone set is off-hook upon receipt of the active incoming message;
   determining whether the subscriber has input at the subscriber's telephone set a request to hear the active incoming message;
   connecting the active incoming message to the subscriber's telephone set in a listen only mode in response to determination of a received request to hear the active incoming message; and
   placing an original caller already connected to the subscriber's telephone set on hold while the subscriber connects to and listens to the active incoming message.

12. The method set forth in claim 11, wherein said step of determining whether the subscriber has input a request comprises the step of detecting a FLASH hook signal generated by the subscriber's telephone set.

13. The method set forth in claim 11, further comprising the steps of:
   detecting a re-connect request input by the subscriber while in the listen only mode of the active incoming message;
   re-connecting the subscriber to the original caller in response to a detected re-connect request; and
   continuing to record the active incoming message.

14. The method set forth in claim 11, further comprising the steps of:
   detecting an interrupt request input by the subscriber while in the listen only mode of the active incoming message;
   connecting the subscriber to the calling party in place of broadcasting of the active incoming message in response to a detected interrupt request;
   discontinuing recording of the active incoming message upon connecting the subscriber to the calling party; and
   maintaining the original caller on hold while the subscriber communicates with the calling party.

15. The method set forth in claim 11, further comprising the steps of:
   continuing to record the active incoming message when no request to hear the active incoming message is detected.

16. The method set forth in claim 13, wherein said re-connect request comprises a FLASH hook signal generated by the subscriber's telephone set.

17. The method set forth in claim 14, wherein said interrupt request is input by activation of one of a predetermined DTMF key, a predetermined sequence of DTMF keys, a dedicated key on the subscriber's telephone set and a voice command.

18. The method set forth in claim 1, further comprising the steps of:
   determining by the voice mail system, whether the subscriber has input at the subscriber telephone set an activation code to activate one of at least two different broadcasting modes of the incoming voice message;
   determining, by the voice mail system and in response to a determination that an activation code has been input, whether the subscriber has input at the subscriber's telephone set an interruption request indicating a subscriber's desire to interrupt the incoming active voice mail message; and
   interrupting said transmitting of the incoming voice mail message in response to a determination that the subscriber has input the interrupt request.

* * * * *